Dec. 13, 1927.
E. D. EBY
1,652,893
HIGH POTENTIAL CABLE JOINT AND METHOD OF INSTALLATION
Filed Feb. 21, 1927
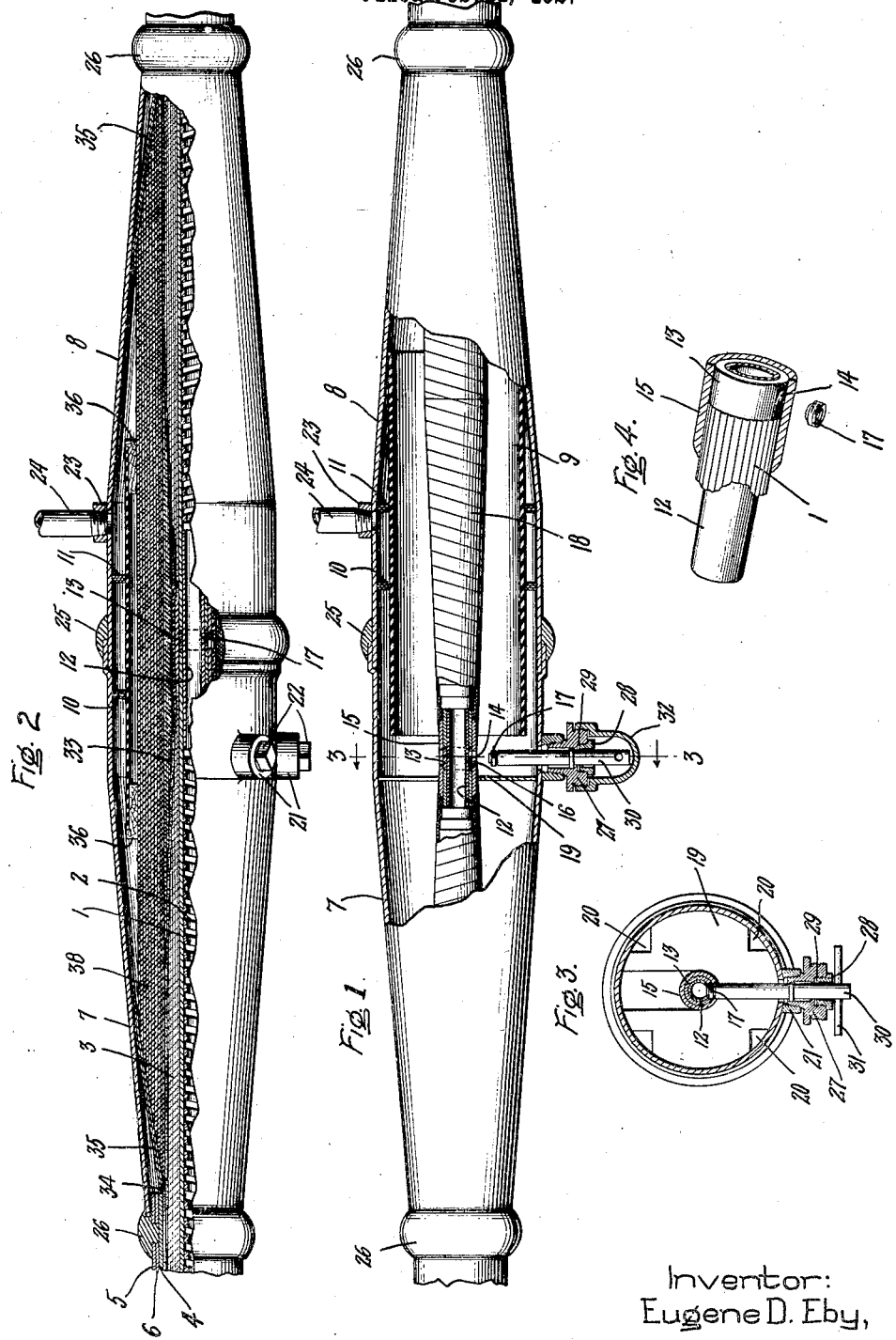
Inventor:
Eugene D. Eby,
by *Alexander S. ...*
His Attorney.

Patented Dec. 13, 1927.

1,652,893

UNITED STATES PATENT OFFICE.

EUGENE D. EBY, OF PITTSFIELD, MASSACHUSETTS, ASSIGNOR TO GENERAL ELECTRIC COMPANY, A CORPORATION OF NEW YORK.

HIGH-POTENTIAL CABLE JOINT AND METHOD OF INSTALLATION.

Application filed February 21, 1927. Serial No. 169,712.

The present invention relates to underground transmission of electrical energy at high potential, and has for its object the provision of an improved construction of insulated joint for connecting together sections of insulated cable and an improved method of installation whereby relatively great lengths of cable may be placed underground and effectively treated to expel all air and moisture, electrically and mechanically tested and defects economically remedied while in a more or less incomplete condition, and upon proving satisfactory on test the joints may thereafter be completed to sustain continued heavy service.

One form of my improved joint is shown in the accompanying drawing in which Fig. 1 is a side elevation with parts in section of the joint as made up for testing out; Fig. 2 is a similar view of the joint as made up for continuous service; Fig. 3 is a cross section of the temporary joint on line 3—3 of Fig. 1; and Fig. 4 is a perspective view of the connector for the metallic conductor.

The high potential cable shown is of the hollow core oil filled type consisting of a plurality of copper wires 1 laid up about a central channel or helix of copper ribbon 2 and insulated externally by many layers of paper 3 wrapped on in the form of tapes and this insulation is incased in two concentric lead sheaths 4 and 5 with an interposed wrapping of bronze ribbon 6 to reinforce them against disruption under the hydrostatic pressure exerted by the insulating oil with which the cable is filled in use. The cable as received from the factory is usually in sections of a few hundred feet and instead of a filling of oil has some inert gas, such as carbon dioxide, hermetically sealed therein to keep out air and moisture.

It is common practice in this country to draw the cable sections into underground conduits extending from manhole to manhole and join them end to end therein. The number of manholes per mile varies according to local conditions, being anywhere from eight to twenty, and this means that in the installation of a three-phase circuit, with each phase in a single cable, there are twenty-four to sixty joints required to be made per mile.

The task of completely making a proper cable joint with the incident necessity to protect all parts from sweat or other moisture and from dust or other foreign particles is highly expert and usually requires a corps of four to six skilled linemen and plumbers an entire day per joint.

In case a section of cable is found on test to be defective for any reason after installation, two joints must be undone, a new section of cable drawn into the underground conduit in replacement thereof, and the two joints remade. With a view to reducing as much as possible the delay and expense incident to the replacement of defective sections, my improved joints are designed to be made up temporarily so that a series of cable sections may be gas treated, evacuated and filled with oil, subjected to pressure, and the necessary mechanical and electrical tests made.

After the whole series of connected sections of cable has been found to be in proper condition, the temporary joints are then opened and the most painstaking and time-consuming operation of winding the great number of wrappings of tape insulation performed and the joint completed in permanent shape.

The outer incasement of a cable joint consists of two trumpet-shaped metal shells 7 and 8 adapted to be united at their larger ends and with their smaller ends of a size to fit loosely over the outer sheaths 5 of the cable ends to be joined. After the shells 7 and 8 have been threaded over their respective cable ends and far enough back to be out of the way, a barrier sleeve 9 of insulation is inserted in one of the shells, the right-hand one 8 for instance, together with spacing rings 10 and 11 of insulating material.

Short sections of the sheaths and paper insulation 3 are then removed from the respective cable ends to expose the conductor wires 1, a number of convolutions of the central helix 2 are then pulled out from each end and cut off. The remaining ends are then forced back into the channel. A length of metal tubing 12 with an integral central collar 13 having a radially tapped hole 14 in a side wall is inserted in one of the cable ends and a metal splicing sleeve 15 also provided with a radial hole 16 is slipped over the collar 13 and over the ends of the stripped conductors 1. The other cable end is aligned with the former and moved axially to cause the stripped wires 1 thereof to enter the annular receptacle formed between the free ends of the tube 12 and sleeve 15 until the wires of both cable ends abut against opposite edges of the collar 13.

The sleeve 15 and the tube 12 are adjusted so that the holes 16 and 13 align with each other at the lowermost side of the cables and a plug 17 is screwed home therein.

The splicing sleeve 15 has a slot through its uppermost wall through which solder is poured to effect the metallic and electrical union between the tube 12, sleeve 15, and the wire ends 1 disposed between them.

The sheaths 4 and 5 and reinforcement ribbon 6 are removed for a considerable distance back from each cable end sufficiently to permit the paper insulation 3 to be removed so as to leave extended stepped cones on the unremoved paper insulation. After filling treated yarn into all the small corners and crevices of the stepped insulation, these cone-shaped ends are then tightly wrapped with cambric tape 18 to protect them from disturbance and foreign matter.

In order to support the spliced ends of cable concentric with the shell sections 7 and 8, a sectional spacing washer 19 of insulating material is positioned radially upon the splicing sleeve 15. The outer periphery of the washer is adapted to fit easily within one of the shell sections 7, and in order that it may not interfere with the circulation of insulating liquid within the shell notches 20 are cut in the periphery as indicated in Fig. 3.

One of the shell sections, 7 for instance, is provided in its lower side with one or two holes having threaded bosses 21 adapted for the reception of plugs 22, while the other shell section has in its upper portion a hole having a threaded boss 23 for an ordinary plug or for the attachment of an oil supply pipe 24. The two shell sections 7 and 8 are telescoped together a short distance and the joint between them sealed by solder or other easily removed substance 25, and then accurately positioned with one of the holes 21 in direct alignment with the plug 17 in the splicing sleeve 15. The outer ends of the shell sections 7 and 8 are sealed to the outer sheath 5 by solder or other material 26.

A stuffing box 27 with a gland 28 and gasket 29 for the reception of the shaft of a wrench 30 is screwed into the bossed hole 21 that stands aligned with the plug 17, while the other bossed hole 21 remains closed by an ordinary plug 22. The wrench 30 has a polygonal inner end adapted to fit tightly in a corresponding recess in the plug 17 and its outer end is transversely apertured for the reception of a rod or handle 31.

The plug in threaded boss 23 at the top of the shell section 8 is removed. Suitable connections, through which $CO_2$ under pressure may be admitted, are made to the bottom of the shell so that the air therein may be expelled through hole of boss 23 without tending to mix with the heavier gas. The plug 17 is removed from the wire connector by the wrench 30 and the latter retracted an inch or so and its gland 28 tightened to compress the gasket 29 tightly thereabout. The handle 31 is removed and a metal cap 32 screwed to the stuffing box 27. Upon screwing the plug home in boss 23, the joint is sealed and ready for the pressure and vacuum and other cable treatments which are made when the desired number of cable sections have been joined.

After the desired series of cable sections have been gas and vacuum treated, an insulating liquid is forced therein until all unoccupied spaces within the cables and the joint shells are filled with it and thereafter they are tested under hydrostatic pressure. Any defects found during the treatments and tests are rectified and when all parts of the connected cable sections prove to be in satisfactory condition, the joints are opened up and each made up in permanent condition as follows:

The plug 17 is screwed home in its connector 13 by means of the wrench 30 to seal up the oil in the hollow of the cable. The oil in the shell 7—8 is then drained off and the wrench 30 and its stuffing box 27 removed, the joints 25 and 26 unsealed and the shell sections 7 and 8 and barrier sleeve 9 again moved back out of the way and the spacing washer 19 removed. The protective cambric tape 18 is unwound from the stepped conical ends of the solid paper insulation 3. Treated cambric tape 33 is wound tightly and carefully about the cable until the original diameter of the paper insulation 3 is filled out. The lead sheaths 4 and 5 are cut back to correspond with the ends of the outer shell when in its final position and protective sheath bands 34 of thin metal are forced between the ends of the inner sheaths 4 and the solid paper insulation 3 for about half their widths as shown in Fig. 1 and soldered thereto.

Further treated cambric tape 33 is wound upon the exposed portions of the original paper insulation 3 and upon the previously wound cambric tapes from the end of one sheath band 34 to the other and an insulating reinforcement built up with receding or conical ends until the radial thickness of the central portion of the wound on insulation is substantially double that of the original paper insulation.

In order to provide ground shields 35 from the ends of the sheaths of both cable sections to the maximum diameter of the wound on insulation 33, I wind fine wire in the form of narrow braid tightly over the conical ends of the reinforcement tape and solder the convolutions together, and that convolution nearest the end of the inner sheath 4, thereto, and to sheath band 34.

Upon positioning the barrier sleeve 9 centrally of the joint, it is secured in position by distributed wooden blocks 36 entered between its inner end surfaces and the outer surface of the insulating wrapping 38. The space rings 10 and 11 are adjusted to position and secured to the outer surface of the sleeve 9 by suitable adhesive and the two shell sections 7 and 8 assembled and positioned symmetrically with the center of the cable joint and the joints thereof wiped with solder.

The lower plug or plugs 22 are screwed home in their bosses, the gases within the casing are removed by drawing vacuum through suitable connections thereto, and an insulating liquid is forced into the casing, while vacuum is maintained, until the outer shell is completely filled therewith.

It is evident that my method of making up cable joints enables one very quickly to join up any desired number of cable sections and subject the whole series to the necessary treatments and tests and fill with insulating liquid. In case it be found necessary to replace a cable section for any purpose, the change is readily effected with a minimum loss of time and material and thereafter the completion of the joints for continuous heavy duty is accomplished with only a very slight undoing of the temporary joints, the unsealing of the casing joints, and removal of the protective wrapping 18.

While I have shown and described the best embodiment of the invention known to me, I do not desire to be restricted thereto.

What I claim as new and desire to secure by Letters Patent of the United States is:

1. The method of joining sections of insulated sheathed cable, comprising the removal of portions of the sheaths and solid insulation adjacent the ends of the sections, electrically connecting the conductor ends of the sections, enclosing the section ends in a casing hermetically sealed to the sheaths thereof, treating the connected cable sections, filling all unoccupied space with insulating fluid, testing for and rectifying defects, removing the casing, winding solid insulation about the connector and the ends of the solid insulation of the cable sections, replacing the casing and permanently sealing it to the sheath of the sections, and filling said casing with insulating liquid.

2. The method of joining sections of sheathed cable, comprising the removal of portions of the sheaths adjacent the ends of the sections, removing the solid insulation so as to leave tapered ends on the parts unremoved, soldering a radially apertured tubular connector to the conductors of the sections, enclosing the joint thus formed in a casing heremetically sealed to the sheaths of the sections, treating the joint and cable sections to remove moisture, air and gas, filling all unoccupied space with insulating liquid, testing for and rectifying defects, thereafter closing the radial aperture in the tubular connector, removing the liquid from the casing, removing the casing, wrapping solid sheet insulation about the connector and the ends of the solid insulation of the sections, replacing and permanently sealing the casing to the sheaths of the sections, and filling said casing with insulating liquid.

3. The method of joining sections of sheathed hollow core cable, comprising the removal of portions of the sheaths adjacent the ends of the sections, removing the solid insulation so as to leave tapered ends on the unremoved solid insulation, soldering a radially apertured tubular connector to the ends of the hollow core conductors of the sections, winding a protecting cover of insulation upon the tapered ends of the solid insulation, enclosing the joint thus formed in a metal casing hermetically sealed to the sheaths of the sections, filling all unoccupied space within the shell and the hollow cores of the sections, treating the joint and cable sections to remove moisture, air and gas, electrically and mechanically testing for and rectifying defects, thereafter closing the radial aperture in the tubular connector, withdrawing the insulating liquid from the casing, removing the casing, removing the protecting cover from the tapered ends of the solid insulation, wrapping solid insulation tapes over the connector over the tapered ends of solid insulation and over the outside of the original solid insulation so that the radial thickness of the wound on solid tape insulation is greater than the original thickness of insulation on the sections, connecting ground shields to the sheaths and fitted closely to the ends of the enlargement formed by the wrapped on tape insulation, replacing the metal shell and permanently joining its ends to the sheaths of the sections and refilling said shell with insulating liquid.

4. The method of joining sections of sheathed insulated cable, comprising the removal of portions of the sheaths adjacent the ends of the sections, removal of the solid insulation to leave tapered ends on the unremoved insulation, electrically connecting the ends of the conductors of the sections, wrapping solid insulating tapes over the connected conductor ends and the tapered ends of the solid insulation to the full diameter thereof and continuing said wrapping to build up a reinforcement with receding tapered ends outside the said original diameter of the cable insulation, introducing metal bands for a portion of their widths between the outer surface of the original solid insulation and the ends of the sheaths of the sections, soldering wire braids to the respective bands and sheath ends, winding said braids tightly over the receding tapered ends of the solid insulating reinforcement, soldering the convolutions of the braids together, and enclosing the joint thus formed in a metal shell hermetically joined at its ends to the sheaths of the sections.

5. Means for splicing sections of tubular conductor, comprising a metal tube having a central collar, a sleeve adapted to fit over said collar and form with its edges and the outer surface of the metal tube annular receptacles for the respective ends of the tubular conductor sections, and said collar and said sleeve being radially apertured for the reception of a screw plug.

6. In a joint for hollow core cables, the combination of a tubular connector joining the ends of the conductors of said cables having a tapped radial aperture therein, a metal case about the joint adapted to contain insulating liquid under pressure and a gasketed wrench extending through the wall of said case whereby the radial aperture in said connector may be plugged and unplugged from outside said case.

In witness whereof, I have hereunto set my hand this 18th day of February, 1927.

EUGENE D. EBY.